United States Patent

[11] 3,573,494

[72] Inventors Grover K. Houpt
Wayne;
Edward T. Thomson, Phoenixville; Joseph
A. Kihm, King of Prussia, Pa.
[21] Appl. No. 697,470
[22] Filed Jan. 12, 1968
[45] Patented Apr. 6, 1971
[73] Assignee Automatic Timing & Controls, Inc.
King of Prussia, Pa.

[54] DIFFERENTIAL TRANSFORMER
DEMODULATING CIRCUIT
8 Claims, 2 Drawing Figs.

[52] U.S. Cl. ............................................. 307/235,
307/232, 307/249, 307/295, 307/309, 321/43,
323/51, 340/199
[51] Int. Cl. ............................................. H03k 5/20,
H01r 5/00
[50] Field of Search ........................................ 307/235,
232, 249, 299 (A), 295, 308, 309; 321/43, 46, 47;
323/51; 340/199; 324/118, 119; 329/200; 332/12,
16

[56] References Cited
UNITED STATES PATENTS
2,897,379 7/1959 Hinsdale ..................... 307/232
2,953,738 9/1960 Bright ......................... 321/47
3,042,872 7/1962 Brahm ......................... 307/295X
3,210,746 10/1965 Clapp .......................... 340/199
3,456,132 7/1969 Dechelotte ................... 340/199X
3,458,798 7/1969 Fang et al. ................... 321/43
3,225,289 12/1965 Koppel et al. ................ 321/43X OTHER REFERENCES
Pub. I, " The Inch - Discussion and Applications" by B.
Mitchell and B. Bell in " Solid State Design" dated October
1962; Pages 40 to 42 & FIG. 21 relied on.
Pub. II, " Transistor Half Wave Rectifier" by Busch et al. in
IBM Tech. Disclosure Bulletin, Vol. I, No. 2, Aug. 1958; Page
36.

Primary Examiner—Stanley D. Miller, Jr.
Attorney—Nelson E. Kimmelman and Maleson, Kimmelman
and Ratner ABSTRACT: A demodulating circuit is disposed in series in
the secondary winding circuit of a differential transformer.
The demodulation circuit has an auxiliary winding magnetically coupled to the primary winding and the ends of the auxiliary winding are coupled to two electrodes of a solid-state
device which also has two emitters. The two emitters of the
device are connected in series with the secondary winding of
the transformer and with a smoothing network for the
demodulated AC voltage.

Patented April 6, 1971

3,573,494

INVENTORS
GROVER K. HOUPT
EDWARD T. THOMSON
JOSEPH A. KIHM

BY Maleson, Kimmelman & Ratner
ATTORNEYS

3,573,494

DIFFERENTIAL TRANSFORMER DEMODULATING CIRCUIT

BACKGROUND OF THE INVENTION

1. Field of the Invention

This invention relates to a circuit for demodulating AC and in particular to a circuit which is adapted to be integrated with a differential transformer for demodulation of voltages induced in its secondary winding.

2. Prior Art

The differential transformer is a very valuable tool in measuring the change of a condition and producing a corresponding voltage signal. In general it includes a primary winding which is excited by an appropriate source of an AC voltage, a moving armature made of a magnetic material, and one or more secondary windings which produce an output signal whose amplitude and polarity depend upon the departure of the armature from a predetermined reference or "null" position. The armature itself is coupled by any appropriate linkage so as to be moved in response to the change of a condition, i.e., weight, flow, etc. In many applications of the differential transformer, the signal produced at the secondary winding is demodulated for application to appropriate utilization devices.

Some of the prior art demodulating circuits used with differential transformers have employed two diodes connected to the ends of two secondary windings which are wound or disposed in voltage-bucking relation to one another. There are also two resistors respectively connected between the junction of the two windings and the diodes respectively. This type of demodulation circuit depends upon the balancing of the voltages induced in the secondary windings. It is desirable to have as low a "null voltage" as is possible when the armature is at its reference position so that the error voltages induced in the secondary winding will correspond more accurately to the movement of the armature away from its reference or "null" position. This type of prior art circuit required that both secondary windings, both diodes and both resistors have substantially identical characteristics. To obtain such identity is a relatively difficult and expensive task. It was also characteristic of this circuit that the output voltage was not as high as it might be since there was considerable loading on the differential transformer due to the presence of the two balancing resistors across the two secondary windings. Another characteristic of this prior art circuit was that it was somewhat more sensitive to variations in the frequency of the input signal than was desired. Other prior art demodulating circuits included bridge circuits which presented similar problems of balancing accuracy.

It is therefore among the objects of the present invention to provide a demodulating circuit, especially for use with a differential transformer, which does not require the matching of windings, diodes, resistors, etc., which is somewhat cheaper and less complex, which produces higher output voltages, and which is less sensitive to variations in the input frequency.

SUMMARY OF THE INVENTION

This invention comprises a demodulating circuit that includes (a) a first inductive winding disposed so as to be threaded by an input signal electromagnetic wave, (b) a solid-state switching device in series with said first winding, and (c) a second inductive auxiliary winding disposed so as to be threaded by said signal wave, and having its ends coupled to said device for enabling conduction of said device only during predetermined polarity portions of said signal wave.

Figure 1:
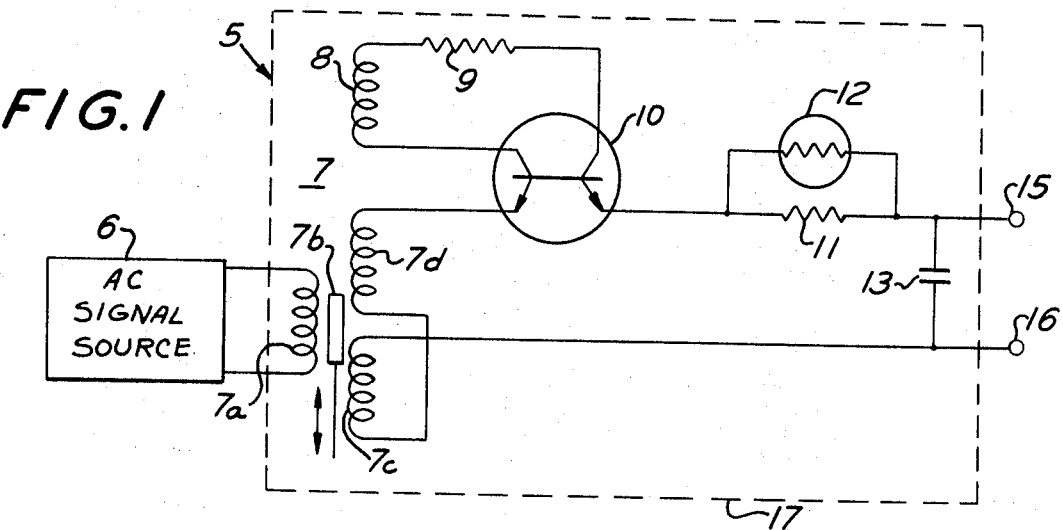
Referring to FIG. 1 there is shown generally at the numeral 5 a circuit in accordance with the present invention which includes an AC signal source 6 that is coupled to the primary winding 7a of a differential transformer indicated generally at the numeral 7. The transformer also includes a movable armature 7b and two secondary windings 7c and 7d which are disposed in voltage-bucking relation to one another. In addition, there is an auxiliary or driving winding 8 which is magnetically coupled to the primary winding 7a, the ends of the auxiliary winding 8 being connected to the collector and base of a dual-emitter transistor 10. A current-limiting resistor 9 is interposed in series in the circuit of the auxiliary winding 8. If desired, the auxiliary winding 8 may be split into two series windings which are respectively wound around one of the secondary windings 7c, 7d, on a coil form with the primary winding 7a being wound between the secondary windings.

The emitters of transistor 10 are connected in series between one end of the winding 7d and one side of a filter resistor 11 which may optionally be shunted by a thermistor 12 to give temperature stability. A capacitor 13 functions to smooth out any ripple in the demodulated signal so that at output terminals 15 and 16 there is a substantially ripple-free DC signal for application to any appropriate utilization circuit (not shown).

The AC signal source 6 may comprise any source of an AC signal in a frequency range, for example, of 60 cycles per second to 5,000 cycles per second. As the armature 7b moves up and down, the amount of signal induced in the secondary windings will vary as will the polarity to indicate the amplitude and direction of deviation of the condition being sensed from the predetermined reference voltage ("null voltage").

Figure 2:
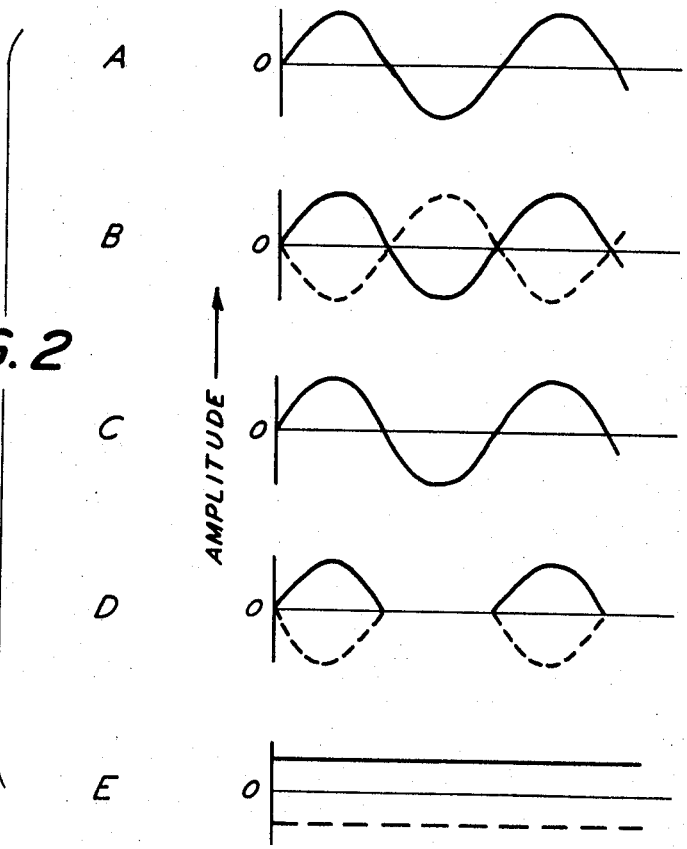

As may be seen by reference to FIG. 2, Part A there are shown several cycles of a typical AC input signal from the source 6 to the primary winding 7a. In Part B, the solid line curve shows the voltage produced across the secondary winding 7c and 7d. Part C shows the voltage induced in the driver winding 8. Part D shows the voltage produced between terminal 16 and the junction of filter resistor 11 and the emitter to which it is connected. It will be seen that each time there is a positive half cycle induced in the winding 8, there will be substantially a short circuit between the emitters of the transistor 10 so that the voltage as shown in Part B will be transmitted to the filter circuit. Part E shows the substantially ripple-free voltage at the output terminals 15 and 16.

If the armature 7b moves to a point in the opposite direction past the null point, the broken-line curve shown in Part B will represent the signal across the windings 7c and 7d, i.e., a signal of the opposite polarity. Notwithstanding a change in the polarity of this signal, the signal produced in the auxiliary winding 8 will remain the same (Part C) as in the previous case. Therefore, the signal transmitted to the filter circuit via the emitters of the transistor will be negative half cycles as shown in Part D. After the action of the filter circuit upon this signal, the output voltage at the terminals 15 and 16 will be as shown in the broken line curve of Part E.

In the embodiments shown in FIG. 1, all of the components are shown as being enclosed within a magnetic or electric shield or other housing 17. However, if desired, the transistor and the filter circuit may be included with the differential transformer windings in a single magnetic housing while a separate demodulating transformer is disposed external thereto, the primary thereof being in parallel with the primary winding of the differential transformer whereas the secondary winding thereof is coupled to the collector and base of the transistor as shown in FIG. 1.

While the invention has been explained in terms of a dual-emitter chopper transistor, other solid-state devices such as a field effect transistor or a bipolar transistor could likewise be used.

One embodiment of the invention employed the following values of components and proved to be quite successful in its operation. These values are listed solely for the sake of illustration.

| Component No.: | Value or other identification |
|---|---|
| 7 | Primary—310 turns per section (bifilar, 30 ohms per section). Secondary—1,165 turns per section (220 ohms per section). |
| 8 | 300 turns per section (75 ohms per section). |
| 9 | 60 ohms. |

| Component No.: | Value or other identification |
|---|---|
| 10 | NS 6208 (or 3N78 or 3N79). |
| 11 | 375 ohms. |
| 12 | Fenwal JB25J7. |
| 13 | 12MFD. |

Since other modifications which do not depart from the spirit of the invention will occur to one skilled in the art upon perusing the drawings and specifications herein, it is desired that this invention be limited solely by the claims hereinafter.

We claim:

1. A demodulating circuit comprising:
  a. a differential transformer having:
     1. a primary winding adapted to be coupled to a source of a signal having an AC component and producing an electromagnetic wave in response thereto;
     2. a secondary winding disposed to be threaded by said electromagnetic wave whereupon a voltage is induced therein whose amplitude and phase are adapted to be varied in response to modification in the magnetic coupling of said primary to said secondary;
  b. a solid-state switching circuit including at least one transistor and having at least three terminals, a first and a second of said terminals being in series with said secondary winding;
  c. a third inductive winding disposed to be threaded by said electromagnetic wave whereupon a voltage is induced therein having substantially unchanging phase, said third winding being coupled to said switching circuit via at least a third terminal thereof, said unchanging phase voltage enabling conduction of said switching circuit between said first and second terminals.

2. The demodulating circuit according to claim 1, with the addition of a filter circuit coupled to said solid state circuit and to said secondary winding for removing ripple from the signal demodulated by said switching circuit.

3. The demodulating circuit according to claim 1, wherein said secondary winding has two sections disposed in voltage-bucking relation, and wherein said transistor is a dual-emitter transistor whose emitters are connected in series with said secondary winding sections and whose collector and base are coupled to said third winding.

4. The demodulating circuit according to claim 3, wherein said third winding is in two sections and each of said sections is disposed in proximity to one of the sections of said secondary winding.

5. The circuit according to claim 1, wherein said primary and secondary windings are not connected to one another.

6. The circuit according to claim 1, wherein said third winding is coaxial with said first winding.

7. The circuit according to claim 1, wherein said third winding is wound around said secondary winding.

8. The circuit according to claim 1, wherein said primary winding is disposed between said secondary windings.